United States Patent [19]
Ueki

[11] Patent Number: 5,350,987
[45] Date of Patent: * Sep. 27, 1994

[54] DETECTION OF POSITION OF ROTOR IN BRUSHLESS DC MOTOR

[75] Inventor: Yasuhiro Ueki, Sagamihara, Japan

[73] Assignee: Victor Company of Japan, Ltd., Yokohama, Japan

[*] Notice: The portion of the term of this patent subsequent to Oct. 19, 2010 has been disclaimed.

[21] Appl. No.: 998,227

[22] Filed: Dec. 30, 1992

Related U.S. Application Data

[63] Continuation-in-part of Ser. No. 965,035, Oct. 22, 1992, Pat. No. 5,254,912, which is a continuation of Ser. No. 709,601, Jun. 5, 1991, abandoned.

[30] Foreign Application Priority Data

Jun. 8, 1990 [JP] Japan .................................. 2-150627

[51] Int. Cl.$^5$ ............................................. H02P 7/00
[52] U.S. Cl. ..................................... 318/466; 318/254
[58] Field of Search ............... 318/254, 138, 439, 466, 318/696, 685, 686

[56] References Cited

U.S. PATENT DOCUMENTS

| | | | |
|---|---|---|---|
| 4,460,859 | 7/1984 | Remus et al. | 318/696 |
| 4,678,973 | 7/1987 | Elliott et al. | 318/254 |
| 4,752,724 | 6/1988 | Radziwill et al. | 318/254 |
| 4,868,467 | 9/1989 | Davis | 318/254 |
| 4,876,491 | 10/1989 | Squires et al. | 318/138 |
| 4,992,710 | 2/1991 | Cassat | 318/254 |

Primary Examiner—Jonathan Wysocki
Attorney, Agent, or Firm—Lowe, Price, LeBlanc & Becker

[57] ABSTRACT

A rotor magnet is provided with a plurality of magnetic poles spaced by equal angular intervals. A stator has a core divided into a plurality of segments spaced by equal angular intervals. The stator has polyphase stator windings provided on the core segments respectively. First ends of the stator windings are connected to each other at a common junction, and second ends thereof are separate from each other. The number of the core segments differs from that of the magnetic poles. The core segments corresponding to one phase substantially face centers of the magnetic poles of a same type while the core segments corresponding to other phases face positions offset from centers of the magnetic poles. Test currents are fed to the stator windings via the second ends sequentially in different current-feed patterns. Voltages at a given measurement point are detected which occur in correspondence with the different current-feed patterns respectively. Differences are detected between a predetermined reference voltage and the detected voltages at the given measurement point which correspond to the different current-feed patterns respectively. Determination is given of a current-feed pattern from among the different current-feed patterns which corresponds to a maximal difference from among the detected differences. A position of the rotor relative to the stator is detected in response to the feed current corresponding to the determined current-feed pattern.

18 Claims, 7 Drawing Sheets

DETECTION OF POSITION OF ROTOR IN BRUSHLESS DC MOTOR

CROSS-REFERENCES TO RELATED APPLICATIONS

This is a continuation-in-part of U.S. patent application, Ser. No. 965,035, filed on Oct. 22, 1992, now U.S. Pat. No. 5,254,918, which is a continuation of U.S. patent application, Ser. No. 709,601, filed on Jun. 5, 1991 now abandoned.

BACKGROUND OF THE INVENTION

1. Field of the invention

This invention relates to a method of detecting the position of a rotor in a brushless dc motor. This invention also relates to an apparatus for detecting the position of a rotor in a brushless dc motor.

2. Description of the Prior Art

General brushless dc motors include a stator having windings and a rotor having permanent magnets. The stator windings are supplied with drive currents. To drive the rotor satisfactorily, it is necessary to sequentially change the drive currents in response to the angular relation (the positional relation) between the stator windings and the magnetic poles of the rotor.

Some of prior art apparatuses for driving a brushless dc motor include position sensors detecting the angular relation (the positional relation) between stator windings and magnetic poles of a rotor. Drive currents fed to the stator windings are sequentially changed in response to the output signals from the position sensors.

Japanese published examined patent application 61-3193 discloses a prior art advanced apparatus for driving a brushless dc motor which dispenses with position sensors. This prior art advanced apparatus uses the following fact. In a brushless dc motor, as a rotor rotates, voltages are induced in stator windings in dependence on the positional relation between the stator windings and magnetic poles of the rotor. The induced voltages are opposite to drive voltages related to drive currents fed to the stator windings. The induced voltages are generally referred to as "back" voltages. In the prior art advanced apparatus of Japanese patent application 61-3193, the induced voltages are detected as an indication of the positional relation between the stator windings and the magnetic poles of the rotor, and the detected voltages are used for the control of the change of the drive currents.

In brushless dc motors, to satisfactorily start the rotation of a rotor in a desired direction, it is necessary to preliminarily detect the positional relation between stator windings and the magnetic poles of the rotor, and then set the direction of an initial drive current in response to the detected positional relation.

The prior art position-detecting technique in Japanese patent application 61-3193 can not be used for the control of a drive current during a start of a brushless dc motor.

Japanese published unexamined patent application 63-69489 discloses a prior art rotor-position detecting system which can be used for the control of a drive current during a start of a brushless dc motor. In the prior art system of Japanese patent application 63-69489, a test current is sequentially fed to stator windings, and a variation in the test current is detected as an indication of the positional relation between the magnetic poles of the rotor and the stator windings. In this prior art system, the detection of the current-variation necessitates resistors, which dissipate a significant rate of electric power during a post-start normal operation of the motor.

SUMMARY OF THE INVENTION

It is an object of this invention to provide an improved method of detecting the position of a rotor in a brushless dc motor.

It is another object of this invention to provide an improved apparatus for detecting the position of a rotor in a brushless dc motor.

A first aspect of this invention provides a method of detecting a position of a rotor in a brushless dc motor when the rotor is stationary, the motor comprising a rotor magnet provided with a plurality of magnetic poles spaced by equal angular intervals, and a stator having a core divided into a plurality of segments spaced by equal angular intervals, the stator having polyphase stator windings provided on the core segments respectively, the stator windings having first ends and second ends, the first ends being connected to each other at a common junction, the second ends being separate from each other, wherein a total number of the core segments differs from a total number of the magnetic poles, and wherein the core segments corresponding to one phase substantially face centers of the magnetic poles of a same type while the core segments corresponding to other phases face positions offset from centers of the magnetic poles, the method comprising the steps of feeding test currents to the stator windings via the second ends sequentially in different current-feed patterns; detecting voltages at a given measurement point which occur in correspondence with the different current-feed patterns respectively; detecting differences between a predetermined reference voltage and the detected voltages at the given measurement point which correspond to the different current-feed patterns respectively; detecting a maximal difference from among the detected differences; determining a current-feed pattern from among the different current-feed patterns which corresponds to the detected maximal difference; and detecting a position of the rotor relative to the stator in response to the feed current corresponding to the determined current-feed pattern.

A second aspect of this invention provides a method of detecting a position of a rotor in a brushless dc motor when the rotor is stationary, the motor comprising a rotor magnet provided with a plurality of magnetic poles spaced by equal angular intervals, and a stator having a core divided into a plurality of segments spaced by equal angular intervals, the stator having three-phase stator windings provided on the core segments respectively, the stator windings having first ends and second ends, the first ends being connected to each other at a common junction, the second ends being separate from each other, wherein a total number of the core segments differs from a total number of the magnetic poles, and wherein the core segments corresponding to one phase among three phases substantially face centers of the magnetic poles of a same type while the core segments corresponding to two other phases face positions offset from centers of the magnetic poles, the method comprising the steps of feeding test currents to the three-phase stator windings via the second ends sequentially in different current-feed patterns; detecting voltages at a given measurement point which occur in correspondence with the different current-feed patterns respectively; detecting differences between a predetermined reference voltage and the detected voltages at the given measurement point which correspond to the different current-feed patterns respectively; detecting a maximal difference from among the detected differences; determining a current-feed pattern from among the different current-feed patterns which-corresponds to the detected maximal difference; and detecting a position of the rotor relative to the stator in response to the feed current corresponding to the determined current-feed pattern.

A third aspect of this invention provides an apparatus for detecting a position of a rotor in a brushless dc motor when the rotor is stationary, the motor comprising a rotor magnet provided with a plurality of magnetic poles spaced by equal angular intervals, and a stator having a core divided into a plurality of segments spaced by equal angular intervals, the stator having polyphase stator windings provided on the core segments respectively, the stator windings having first ends and second ends, the first ends being connected to each other at a common junction, the second ends being separate from each other, wherein a total number of the core segments differs from a total number of the magnetic poles, and wherein the core segments corresponding to one phase substantially face centers of the magnetic poles of a same type while the core segments corresponding to other phases face positions offset from centers of the magnetic poles, the apparatus comprising means for feeding test currents to the stator windings via the second ends sequentially in different current-feed patterns; means for detecting voltages at a given measurement point which occur in correspondence with the different current-feed patterns respectively; means for detecting differences between a predetermined reference voltage and the detected voltages at the given measurement point which correspond to the different current-feed patterns respectively; means for detecting a maximal difference from among the detected differences; means for determining a current-feed pattern from among the different current-feed patterns which corresponds to the detected maximal difference; and means for detecting a position of the rotor relative to the stator in response to the feed current corresponding to the determined current-feed pattern.

A fourth aspect of this invention provides an apparatus for detecting a position of a rotor in a brushless dc motor when the rotor is stationary, the motor comprising a rotor magnet provided with a plurality of magnetic poles spaced by equal angular intervals, and a stator having a core divided into a plurality of segments spaced by equal angular intervals, the stator having three-phase stator windings provided on the core segments respectively, the stator windings having first ends and second ends, the first ends being connected to each other at a common junction, the second ends being separate from each other, wherein a total number of the core segments differs from a total number of the magnetic poles, .and wherein the core segments corresponding to one phase among three phases substantially face centers of the magnetic poles of a same type while the core segments corresponding to two other phases face positions offset from centers of the magnetic poles, the apparatus comprising means for feeding test currents to the three-phase stator windings via the second ends sequentially in different current-feed patterns; means for detecting voltages at a given measurement point which occur in correspondence with the different current-feed patterns respectively; means for detecting differences between a predetermined reference voltage and the detected voltages at the given measurement point which correspond to the different current-feed patterns respectively; means for detecting a maximal difference from among the detected differences; means for determining a current-feed pattern from among the different current-feed patterns which corresponds to the detected maximal difference; and means for detecting a position of the rotor relative to the stator in response to the feed current corresponding to the determined current-feed pattern.

DESCRIPTION OF THE BASE OF THE INVENTION

Figures 2A, 2B:
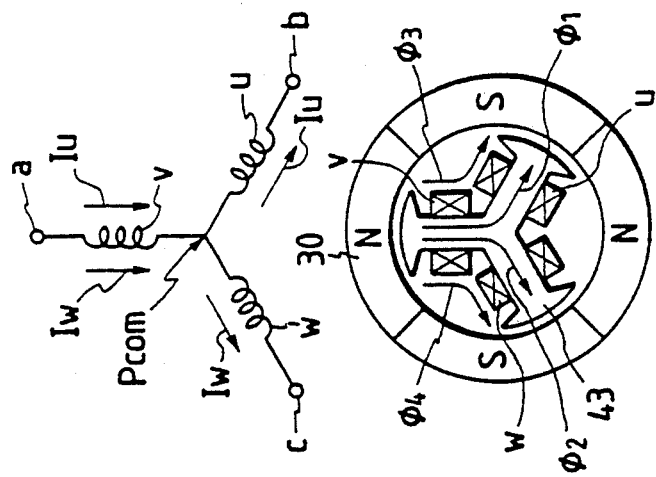
FIGS. 1 and 2 are diagrams of stator windings and magnetic poles of a rotor in this invention.
Figures 1A, 1B:
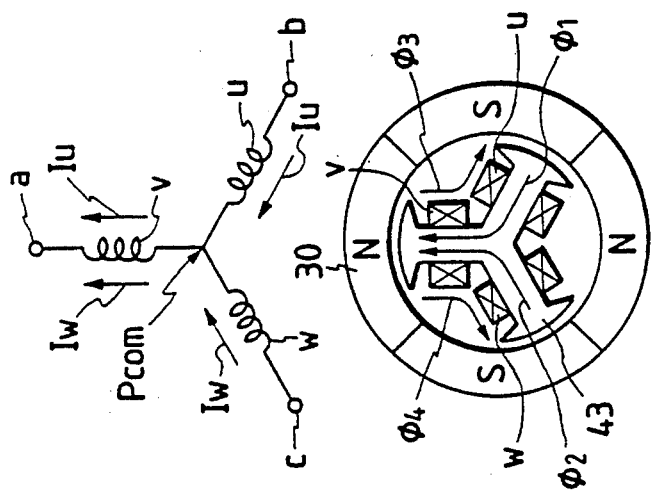

With reference to FIGS. 1 and 2, a brushless dc motor includes a rotor 30, and a stator having a magnetic core 43 and three-phase windings "U", "V", and "W". The rotor 30 has four magnetic poles "N" and "S" which are alternately arranged around the stator core 43 and which occupy equal angular ranges. The magnetic core 43 is made of ferromagnetic material. In the illustrations of FIGS. 1 and 2, the magnetic core 43 has three segments which extend radially from the center of the stator and which are spaced at equal angular intervals. The three-phase stator windings "U", "V", and "W" are formed on the three segments of the magnetic core 43 respectively. First ends of the three-phase stator windings "U", "V", and "W" are connected in common at a junction Pcom. Second ends of the three-phase stator windings "U", "V", and "W" are connected to separate terminals respectively.

Under conditions where the stator windings "U", "V", and "W" assume such positions relative to the magnetic poles of the rotor 30 as shown in the part (b) of FIG. 1 and where a current Iw flows through the stator windings "W" and "V" and a current Iu flows through the stator windings "U" and "V" as shown in the part (a) of FIG. 1, magnetic fluxes $\phi 1$–$\phi 4$ are generated in the magnetic core 43 as shown in the part (b) of FIG. 1. It should be noted that, in the illustration of the part (b) of FIG. 1, the magnetic fluxes $\phi 3$ and $\phi 4$ are shown as extending outside the magnetic core 43 for clarity. The magnetic fluxes $\phi 1$ and $\phi 2$ are generated by the currents Iw and Iu. The magnetic fluxes $\phi 3$ and $\phi 4$ are generated by the magnetic poles of the rotor 30. Under the conditions of FIG. 1, the direction of the magnetic flux $\phi 1$ is opposite to the direction of the magnetic flux $\phi 3$, and the direction of the magnetic flux $\phi 2$ is opposite to the direction of the magnetic flux $\phi 4$. Thus, a magnetic saturation does not occur in the magnetic core 43.

Under conditions where the stator windings "U", "V", and "W" assume such positions relative to the magnetic poles of the rotor 30 as shown in the part (b) of FIG. 2 and where a current Iw flows through the stator windings "W" and "V" and a current Iu flows through the stator windings "U" and "V" as shown in the part (a) of FIG. 2, magnetic fluxes $\phi 1$–$\phi 4$ are generated in the magnetic core 43 as shown in the part (b) of FIG. 2. It should be noted that, in the illustration of the part (b) of FIG. 2, the magnetic fluxes $\phi 3$ and $\phi 4$ are shown as extending outside the magnetic core 43 for clarity. The magnetic fluxes $\phi 1$ and $\phi 2$ are generated by the currents Iw and Iu. The magnetic fluxes $\phi 3$ and $\phi 4$ are generated by the magnetic poles of the rotor 30. Under the conditions of FIG. 2, the direction of the magnetic flux $\phi 1$ is equal to the direction of the magnetic flux $\phi 3$, and the direction of the magnetic flux $\phi 2$ is equal to the direction of the magnetic flux $\phi 4$. Thus, a magnetic saturation tends to occur in the magnetic core 43.

The conditions of FIG. 1 are similar to the conditions of FIG. 2 in the positional relation between the stator windings "U", "V", and "W" and the magnetic poles of the rotor 30. The conditions of FIG. 1 are different from the conditions of FIG. 2 in that the directions of the currents Iw and Iu of FIG. 1 are opposite to the directions of the currents Iw and Iu of FIG. 2.

Generally, the permeability of the magnetic core 43 depends on the magnetic flux passing therethrough or on the degree to which the magnetic core 43 is close to a fully saturated state. In addition, the inductances of the stator windings "U", "V", and "W" depend on the permeability of the magnetic core 43. As understood from FIGS. 1 and 2, the magnetic flux passing through the magnetic core 43 depends on the positional relation between the stator windings "U", "V", and "W" and the magnetic poles of the rotor 30, and also depends on the currents flowing through the stator windings "U", "V", and "W". Therefore, the inductances of the stator windings "U", "V", and "W" depend on the positional relation between the stator windings "U", "V", and "W" and the magnetic poles of the rotor 30, and also depend on the currents flowing through the stator windings "U", "V", and "W". Thus, provided that the currents flowing through the stator windings "U", "V", and "W" are known, the positional relation between the stator windings "U", "V", and "W" and the magnetic poles of the rotor 30 can be detected from the inductances of the stator windings "U", "V", and "W". In other words, the inductances of the stator windings "U", "V", and "W" can be used as parameters representing the positional relation between the stator windings "U", "V", and "W" and the magnetic poles of the rotor 30.

The inductances of the stator windings "U", "V", and "W" are estimated as follows. Under conditions where the rotor 30 is stationary, during an interval short enough to hold the rotor 30 essentially fixed, test currents are fed to the stator windings "U", "V", and "W" sequentially in different current-feed patterns with a predetermined short change period. Under these conditions, the voltage Vcom induced at the common junction Pcom between the stator windings "U", "V", and "W" depends on the inductances of the stator windings "U", "V", and "W". Thus, the inductances of the stator windings "U", "V", and "W" can be estimated on the basis of the common-junction voltage Vcom, and the positional relation between the stator windings "U", "V", and "W" and the magnetic poles of the rotor 30 can be detected in response to the common-junction voltage Vcom.

The brushless dc motor is controlled as follows. Firstly, a preliminary operation process is performed on the brushless dc motor in an inactive state where the rotor 30 remains stationary. During the preliminary operation process, test currents are fed to the stator windings "U", "V", and "W" sequentially in different current-feed patterns with a predetermined short change period, and the voltage Vcom at the common junction Pcom between the stator windings "U", "V", and "W" is periodically detected in correspondence with the current-feed patterns respectively. The preliminary operation process is executed for a predetermined time short enough to hold the rotor 30 essentially fixed. The inductances of the stator windings "U", "V", and "W" are estimated on the basis of the detected levels of the common-junction voltage Vcom. The positional relation between the stator windings "U", "V", and "W" and the magnetic poles of the rotor 30 is determined in response to the estimated inductances of the stator windings "U", "V", and "W". During a starting operation process subsequent to the preliminary operation process, an initial drive current is fed to the stator windings "U", "V", and "W" in response to the determined positional relation between the stator windings "U", "V", and "W" and the magnetic poles of the rotor 30 to start the rotor 30 in a predetermined desired direction.

DESCRIPTION OF THE FIRST PREFERRED EMBODIMENT

Figure 3:
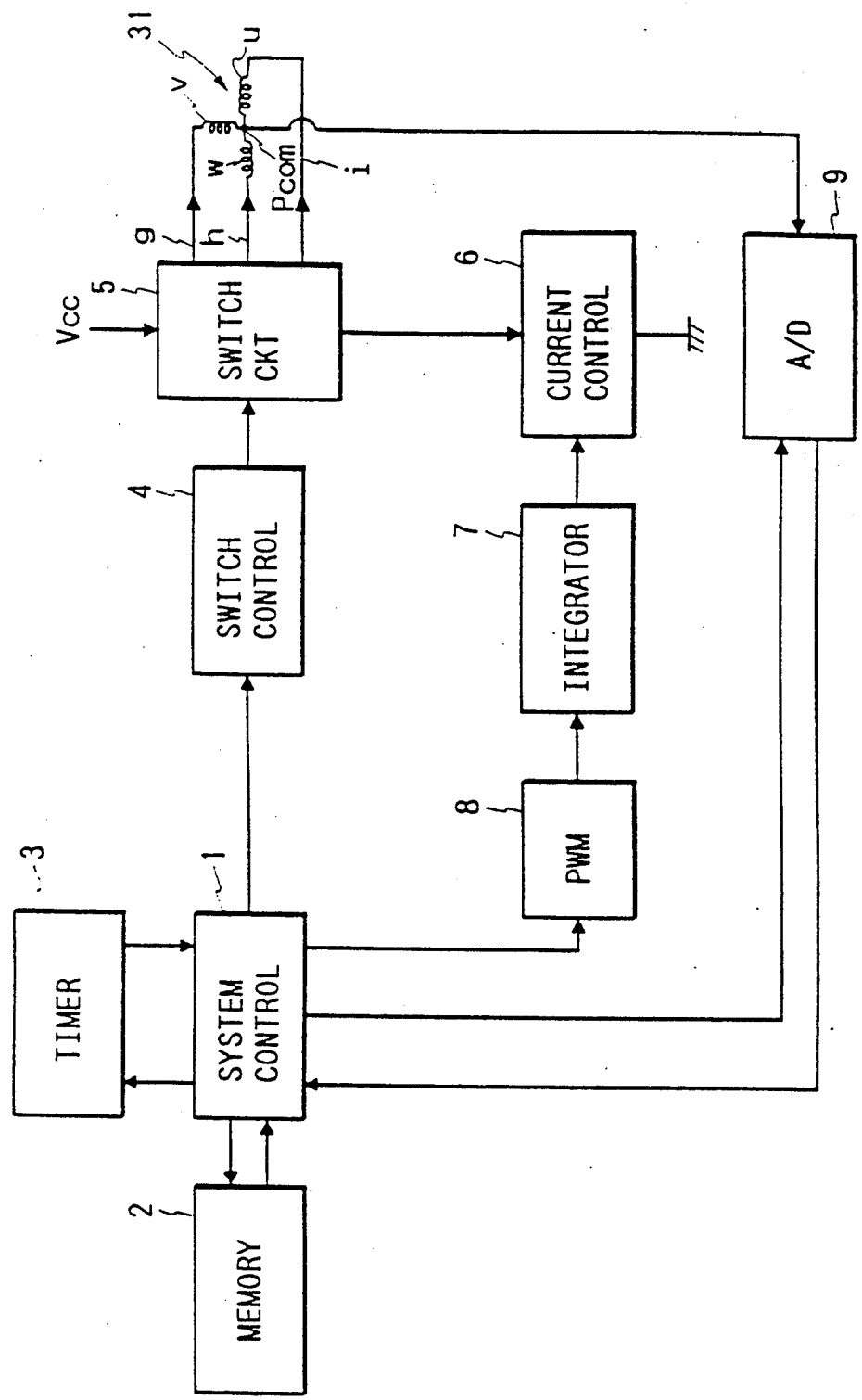
FIG. 3 is a block diagram of a brushless dc motor, and a position detecting and motor controlling system according to a first embodiment of this invention.

With reference to FIG. 3, a system controller 1 includes a microprocessor unit having a combination of a CPU, a ROM, a RAM, and an I/O circuit. As will be explained later, the system controller 1 operates in accordance with a program stored in the ROM.

The system controller 1 is connected to a memory 2, a timer 3, a switch controller 4, a pulse-width modulator 8, and an analog-to-digital converter (an A/D converter) 9. The switch controller 4 is connected to a current switching circuit 5. The current switching circuit 5 is connected to a current controller 6. An integrator 7 is connected between the pulse-width modulator 8 and the current controller 6.

A brushless dc motor includes a stator 31 having three-phase windings "U", "V", and "W". One ends of the stator windings "U", "V", and "W" are connected in common at a junction Pcom. The other ends "i", "g", and "h" of the stator windings "U", "V", and "W" are separately connected to the current switching circuit 5. The common junction Pcom between the stator windings "U", "V", and "W" is connected to the A/D converter 9.

During a normal operation of the motor which follows a preliminary and starting operation of the motor, two of the ends "i", g", and "h" of the stator windings "U", "V", and "W" are selected by the current switching circuit 5, and a drive current is supplied between the selected two stator winding ends by the current switching circuit 5. In this way, two of the stator windings "U", "V", and "W" are selected and energized. The combination of the switch controller 4 and the current switching circuit 5 sequentially changes the selected two stator windings, that is, the two energized stator windings, among all the stator windings "U", "V", and "W" in response to a signal outputted from the system controller 1 to the switch controller 4. The current switching circuit 5 conducts a current from a power supply line Vcc to the selected stator windings as a drive current.

The current controller 6 is disposed in an electric path for conducting the drive current between a power supply and the stator windings "U", "V", and "W". The current controller 6 can vary the level of the drive current. The combination of the pulse width modulator 8, the integrator 7, and the current controller 6 controls the level of the drive current in response to a signal outputted from the system controller 1 to the pulse width modulator 8.

A voltage Vcom at the common junction Pcom between the stator windings "U", "V", and "W" is transmitted to the A/D converter 9. The A/D converter 9 converts the common-junction voltage Vcom into a corresponding digital signal. The output digital signal from the A/D converter 9 is fed to the system controller 1 so that the system controller 1 is informed of the common-junction voltage Vcom.

Figure 4:
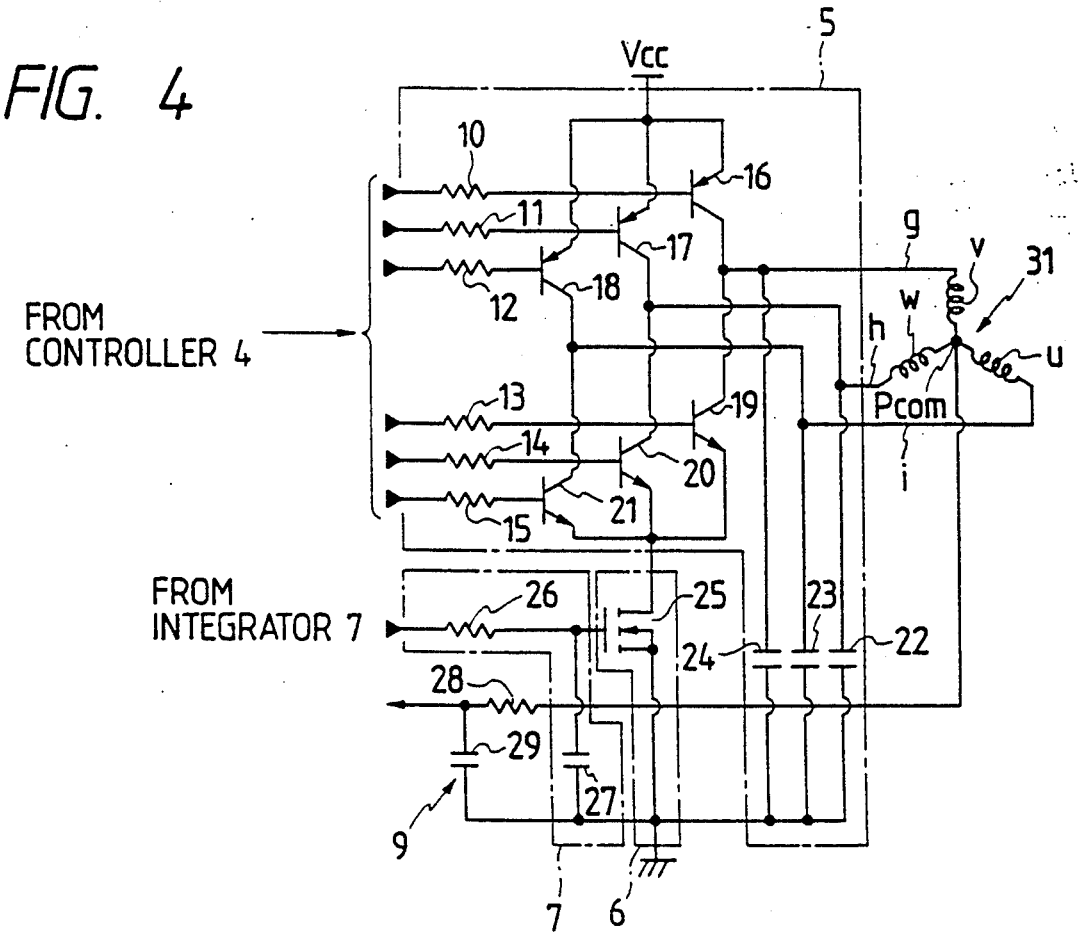
FIG. 4 is a schematic diagram of the brushless dc motor and a portion of the system of FIG. 3.

As shown in FIG. 4, the current switching circuit 5 includes resistors 10–15, PNP transistors 16–18, NPN transistors 19–21, and capacitors 22–23. The emitters of the transistors 16–18 are connected in common to a power feed line Vcc extending from the positive terminal of a drive dc power source. The negative terminal of the drive power source is grounded. The collectors of the transistors 16–18 are connected to the collectors of the transistors 19–21 respectively. The emitters of the transistors 19–21 are connected in common to the current controller 6. The bases of the transistors 16–21 are connected to the switch controller 4 via the resistors 10–15 respectively. The junction between the collectors of the transistors 16 and 19 leads to the end "g" of the stator winding "V". The junction between the collectors of the transistors 17 and 20 leads to the end "h" of the stator winding "W". The junction between the collectors of the transistors 18 and 21 leads to the end "i" of the stator winding "U". The junction between the collectors of the transistors 16 and 19 is grounded via the capacitor 24. The junction between the collectors of the transistors 17 and 20 is grounded via the capacitor 22. The junction between the collectors of the transistors 18 and 21 is grounded via the capacitor 23. The transistors 16–21 serve as switches which change the supply of the drive current to the stator windings "U", "V", and "W" in response to output signals from the switch controller 4.

As shown in FIG. 4, the integrator 7 includes a combination of a resistor 26 and a capacitor 27. The current controller 6 includes a field effect transistor 25. The junction between the resistor 26 and the capacitor 27 within the integrator 7 is connected to the gate of the transistor 25 within the current controller 6. The emitters of the transistors 19–21 within the current switching circuit 5 are grounded via the source-drain path of the transistor 25 within the current controller 6. The transistor 25 within the current controller 6 controls the level of the drive current to the stator windings "U", "V", and "W" in response to an output signal from the integrator 7.

As shown in FIG. 4, a front end of the A/D converter 9 includes a combination of a resistor 28 and a capacitor 29 which form a low pass filter connected to the common junction Pcom between the stator windings "U", "V", and "W".

Figure 5:
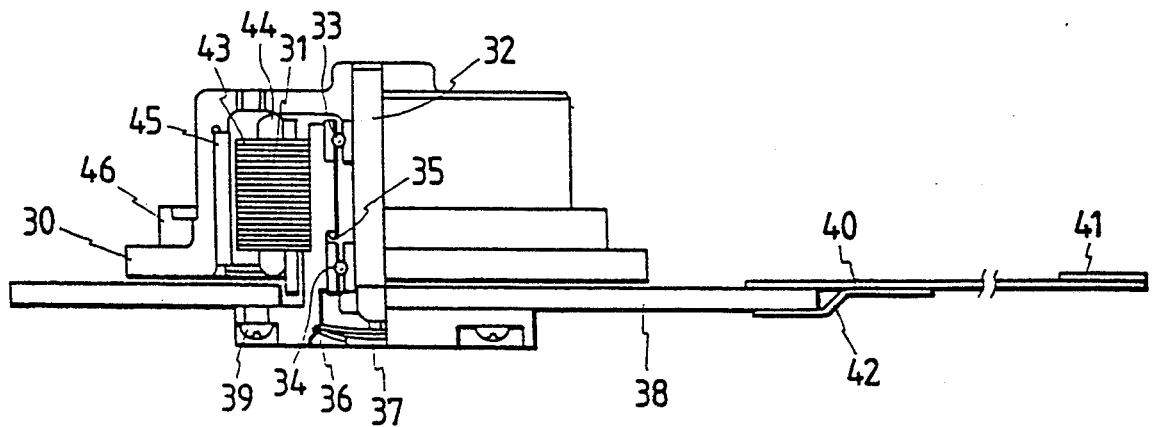
FIG. 5 is a sectional view of the brushless dc motor.

As shown in FIG. 5, the brushless dc motor includes a rotor 30 mounted on a rotor shaft 32. The rotor shaft 32 is rotatably supported by bearings 33 and 34. The rotor shaft 32 is resiliently supported via springs 35 and 36, and a contact spring 37. A printed circuit board 38 has a metal base for the stator 31. The printed circuit board 38 is fixed by screws 39. A flexible connection-line board 40 extends from the printed circuit board 38. A tape 42 supports the connection between the printed circuit board 38 and the connection-line board 40. A tape 41 supports the connection between the connection-line board 40 and a subsequent member (not shown). The stator 31 has ferromagnetic cores 43 provided with stator windings 44, that is, the stator windings "U", "V", and "W" in FIGS. 1 and 2. Permanent magnets 45 are mounted on the rotor 30. A holder 46 mounted on the rotor 30 serves to hold a member, such as a magnetic disk, rotated by the brushless dc motor.

Figure 6:
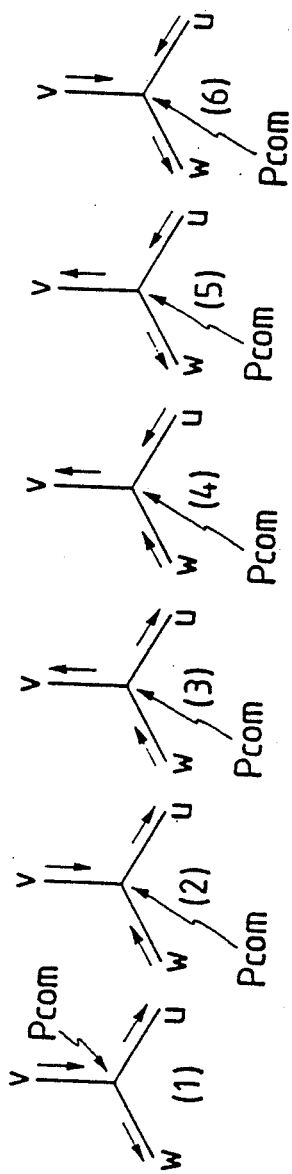
FIG. 6 is a diagram showing six different current-feed patterns in the first embodiment of this invention.
Figure 7A:
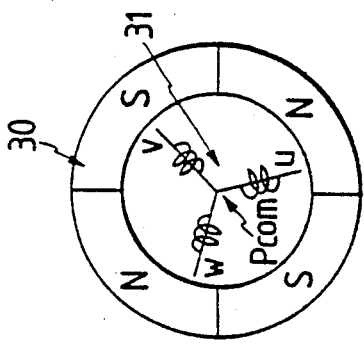
FIGS. 7-9 are diagrams showing the positional relation between the stator windings and the magnetic poles of the rotor, and time-domain variations in the voltage at the common junction between the stator windings.
Figure 8A:
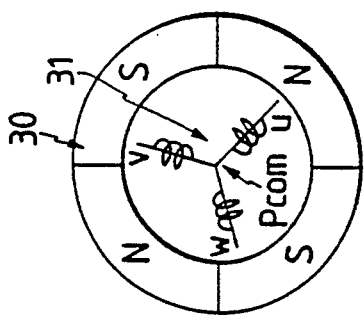
Figure 7B:
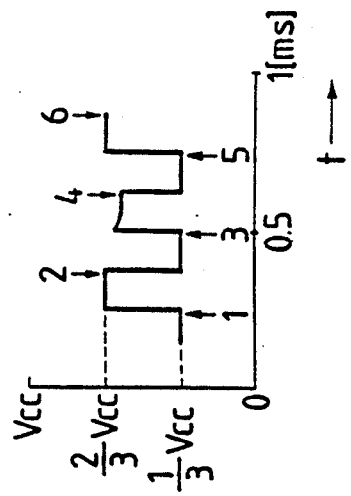
Figure 8B:
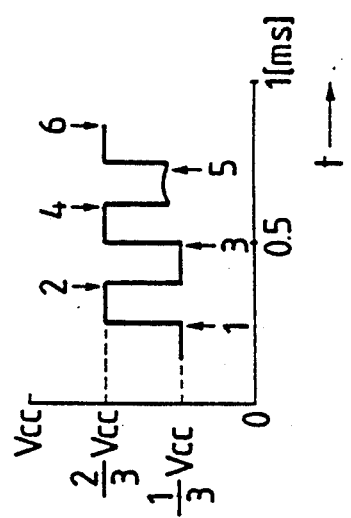

As shown in FIGS. 6–8, the rotor 30 is formed with four magnetic poles "S" and "N" which are alternately arranged along the circumference of the rotor 30 and which occupy equal angular ranges. In the illustrations of FIGS. 6–8, the three core segments extend radially from the center of the stator 31, and are spaced at equal angular intervals. The stator windings "U", "V", and "W" are formed on the three core segments respectively. The ends of the stator windings "U", "V", and "W" which are close to the center of the stator 31 are connected together at the common junction Pcom.

The system controller 1 operates in accordance with a program stored in the internal ROM. This program is designed so as to sequentially execute a preliminary operation process, a starting operation process, and a normal operation process. The preliminary operation process detects the positional relation between the stator windings "U", "V", and "W" and the magnetic poles of the rotor 30 under conditions where the rotor 30 remains stationary. The starting operation process, which follows the preliminary operation process, supplies an initial drive current to the stator windings "U", "V", and "W" in response to the detected positional relation between the rotor 30 and the stator 31 to start the rotor 30 in a predetermined desired direction.

A detailed description will be given of the preliminary operation process. During the preliminary operation process, the system controller 1 controls the pulse width modulator 8 so that the current controller 6 will be held at a fully-conductive state. In addition, during the preliminary operation process, the system controller 1 controls the switch controller 4 so that test currents will be fed via the current switching circuit 5 to the stator windings "U", "V", and "W" and that the test currents will be sequentially and periodically changed among six different current-feed patterns (1)–(6) of FIG. 6. The period of the change of the test currents is set to a small value, for example, about 100 microseconds, at which the common junction voltage Vcom sensitively depends on the inductances of the stator windings "U", "V", and "W". It should be noted that, at a long period of the change of the test currents, static conditions are dominant so that the common junction voltage Vcom is essentially independent of the inductances of the stator windings "U", "V", and "W". Specifically, the timer 3 informs the system controller 1 of intervals corresponding to the period of the change of the test currents, and the system controller 1 generates an instruction of executing the change of the test currents in response to the interval information fed from the timer 3. In addition, the timer 3 informs the system controller 1 of a predetermined elapsed time of, for example, 90 microseconds from the moment of each change of the test currents. The system controller 1 activates the A/D converter 9 in response to the elapsed time information from the timer 3 so that the system controller 1 will be informed by the A/D converter 9 of the common junction voltage Vcom which occurs the predetermined time, for example, 90 microseconds, after each change of the test currents.

Under conditions where the stator windings "U", "V", and "W" have such a positional relation with the magnetic poles of the rotor 30 as shown in the part (a) of FIG. 7, the common junction voltage Vcom varies as shown in the part (b) of FIG. 7 when the feed of the test currents is sequentially changed among the patterns (1)–(6) of FIG. 6. In the part (b) of FIG. 7, the characters (1)–(6) denote the common junction voltages which occur when the test currents are fed in the patterns (1)–(6) of FIG. 6 respectively.

Under conditions where the stator windings "U", "V", and "W" have such a positional relation with the magnetic poles of the rotor 30 as shown in the part (a) of FIG. 8, the common junction voltage Vcom varies as shown in the part (b) of FIG. 8 when the feed of the test currents is sequentially changed among the patterns (1)–(6) of FIG. 6. In the part (b) of FIG. 8, the characters (1)–(6) denote the common junction voltages which occur when the test currents are fed in the patterns (1)–(6) of FIG. 6 respectively.

Figure 9A:
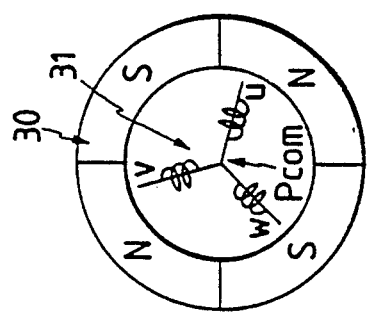
Figure 9B:
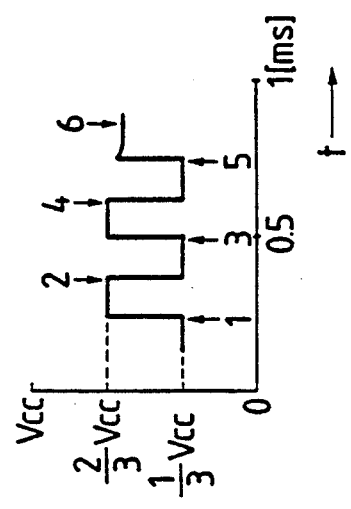

Under conditions where the stator windings "U", "V", and "W" have such a positional relation with the magnetic poles of the rotor 30 as shown in the part (a) of FIG. 9, the common junction voltage Vcom varies as shown in the part (b) of FIG. 9 when the feed of the test currents is sequentially changed among the patterns (1)–(6) of FIG. 6. In the part (b) of FIG. 9, the characters (1)–(6) denote the common junction voltages which occur when the test currents are fed in the patterns (1)–(6) of FIG. 6 respectively.

The parts (a) of FIGS. 7–9 show different positional relations between the stator windings "U", "V", and "W" and the magnetic poles of the rotor 30. As understood from FIGS. 7–9, during the preliminary operation process, the details of the common junction voltage Vcom are varied in response to the positional relation between the stator windings "U", "V", and "W" and the magnetic poles of the rotor 30.

During the preliminary operation process, the system controller 1 loads the memory 2 with the data of the levels of the common junction voltage Vcom which are detected in correspondence with the current-feed patters (1)–(6) respectively. As understood from FIGS. 7–9, the detected levels of the common junction voltage Vcom which correspond to the current-feed patterns (1), (3), and (5) are in a lower level group, while the detected levels of the common junction voltage Vcom which correspond to the current-feed patterns (2), (4), and (6) are in a higher level group. Specifically, the detected levels of the common junction voltage Vcom which correspond to the current-feed patterns (1), (3), and (5) are close to a level of Vcc/3 where Vcc denotes a dc power supply line voltage. On the other hand, the detected levels of the common junction voltage Vcom which correspond to the current-feed patterns (2), (4), and (6) are close to a level of 2Vcc/3. The system controller 1 selects the smallest common junction voltage Vcom from the lower level group, and calculates the absolute value of the difference between the smallest common junction voltage Vcom and each member of the lower level group. In addition, the system controller 1 selects the greatest common junction voltage Vcom from the higher level group, and calculates the absolute value of the difference between the greatest common junction voltage Vcom and each member of the higher level group. The system controller 1 detects the maximal difference among the calculated differences related to all the members of the lower level group and the higher level group, and determines the current-feed pattern corresponding to the maximal difference. The current-feed pattern corresponding to the maximal difference accurately represents the positional relation between the stator windings "U", "V", and "W" and the magnetic poles of the rotor 30 as will be explained later. The positional relation between the rotor 30 and the stator 31 is of 6 different types corresponding to the six different current-feed patterns (1)–(6) respectively. More specifically, there are predetermined six different ranges of the potion of the rotor 30 relative to the stator 31, the six different ranges corresponding to the six different current-feed patterns respectively. The determination of the current-feed pattern corresponding to the maximal difference enables a decision as to which of the six different ranges the position of the rotor 30 relative to the stator 31 is present within. In this way, a detection is given of one of the six different ranges in which the position of the rotor 30 relative to the stator 31 is present.

Figure 10:
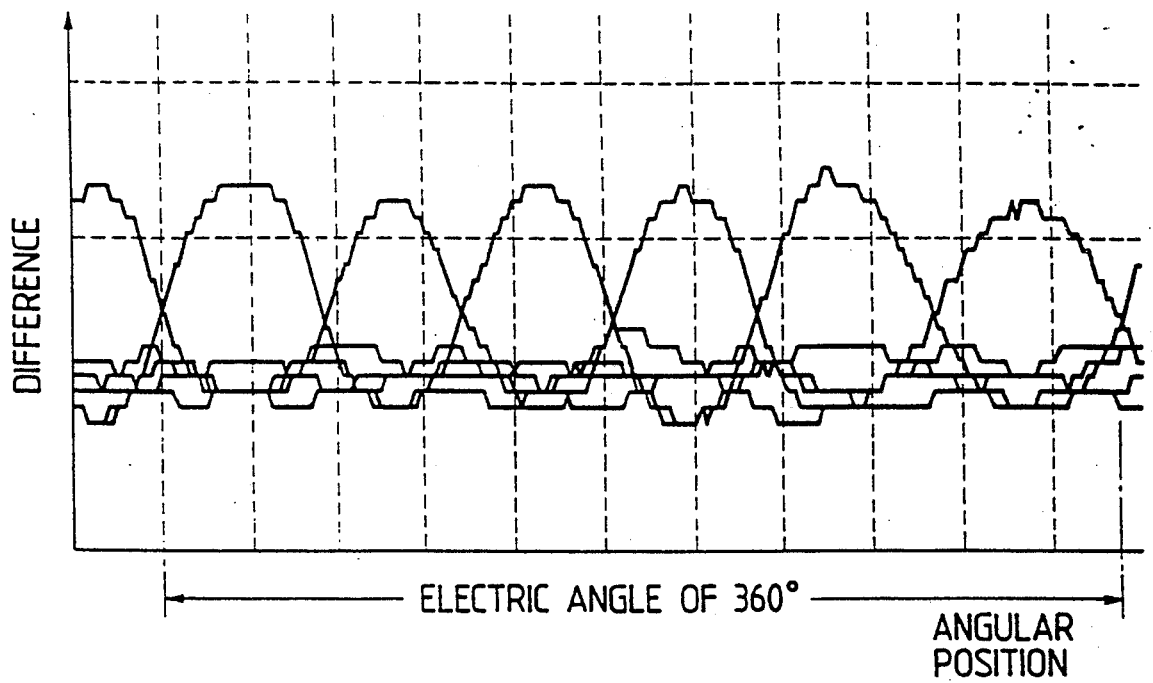
FIG. 10 is a diagram showing the relation between the position of the rotor relative to the stator and the differences between the levels of the voltage at the stator-winding common junction which occur in correspondence with the different current-feed patterns respectively.
Figure 11:
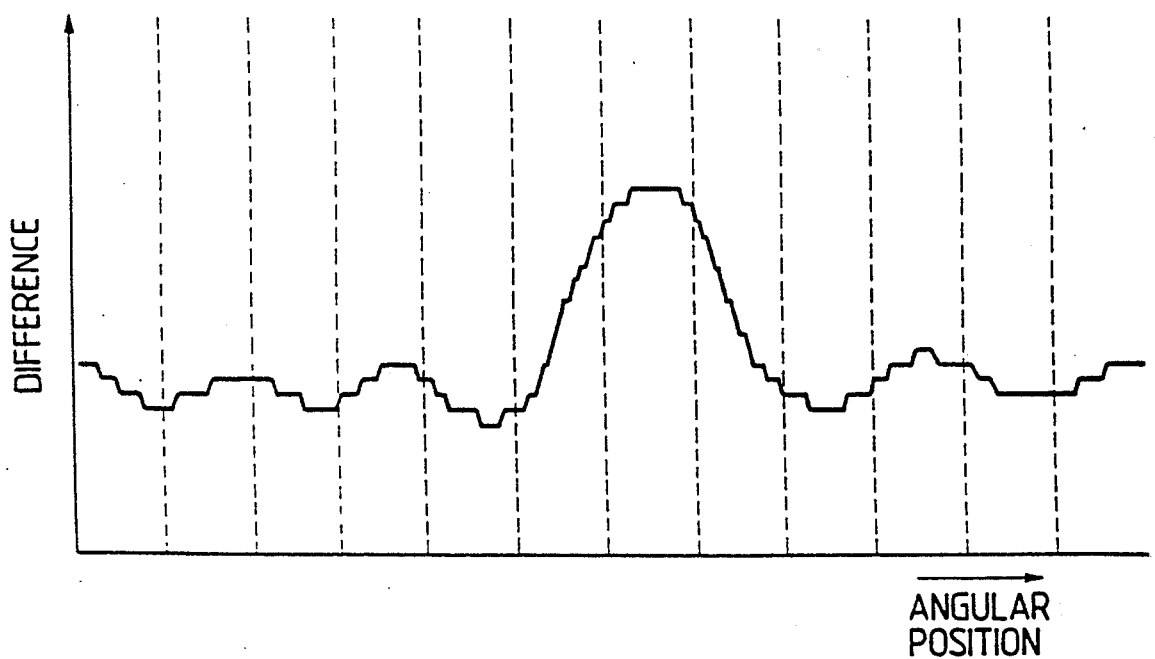
FIG. 11 is a diagram showing one of the characteristic curves in FIG. 10.

During experiments, the common junction voltage Vcom was measured for each of the six different current-feed patterns (1)–(6) at varying positions of the stator windings "U", "V", and "W" relative to the magnetic poles of the rotor 30. For each of the varying positions of the stator windings "U", "V", and "W" relative to the magnetic poles of the rotor 30, the differences between the levels of the common junction voltage Vcom which corresponded to the respective current-feed patterns (1)–(6) were calculated. FIG. 10 shows the results of the calculated differences which are plotted as a function of an electric angle, or the angular position of the rotor 30 relative to the stator 31. The electric angle will be explained later. As shown in FIG. 10, the relations of the calculated differences with the electric angle are denoted by six different curves which overlap with each other at equal phase differences or offsets. The six curves are of equal shapes each having a single high peak for an electric angle of 360 degrees as shown in FIG. 11. As shown in FIG. 10, the six curves have six equally-spaced high peaks for an electric angle of 360 degrees. Thus, the range of the position of the rotor 30 relative to the stator 31 which corresponds to an electric angle of 360 degrees can be divided into six sub-ranges, and the six sub-ranges correspond to the six different current-feed patterns respectively. The determination of the current-feed pattern corresponding to the maximal difference identifies one of the six sub-ranges in which the position of the rotor 30 relative to the stator 31 is present. Therefore, the current-feed pattern corresponding to the maximal difference accurately represents the positional relation between the rotor 30 and the stator 31, that is, the positional relation between the magnetic poles of the rotor 30 and the stator windings "U", "V", and "W".

After the preliminary operation process is completed, the system controller 1 starts to execute the starting operation process. During the starting operation process, the system controller 1 determines a desired direction of an initial drive current and selects desired two stator windings in response to the positional relation between the rotor 30 and the stator 31 which is detected in the preliminary operation process. The desired direction of the initial drive current and the desired two stator windings are chosen so that the rotor 30 will start to be rotated in a predetermined target direction if the initial drive current of the desired direction is fed to the desired two stator windings. The system controller 1 controls the switch controller 4 in response to the desired direction of the initial drive current and the desired two stator windings so that an initial current of the desired direction will be actually fed via the current switching circuit 5 to the desired stator windings. As a result, the rotor 30 actually starts to be rotated in the predetermined target direction.

An electric angle is defined as follows. When a drive current is passed through two of the stator windings "U", "V", and "W", the outer ends of the stator windings "U" and "W" exhibit the magnetic poles in response to the drive current. There occurs an interaction between the magnetic poles of the rotor 30 and the magnetic poles of the stator 31. Provided that the position of the rotor 30 relative to the stator 31 differs from an equilibrium point, this interaction exerts a torque on the rotor 30 so that the rotor 30 can rotate. Under conditions where the direction of the drive current remains unchanged, there is a certain limitation on the range of the angular position of the rotor 30 relative to the stator 31 in which the rotor 30 remains subjected to a torque of one direction. This limited range of the angular position of the rotor 30 is defined as an electric angle of 180 degrees. In the angular range corresponding to an electric angle of 180 degrees, the generated torque on the rotor 30 is weak in portions near the ends of the range. Furthermore, the direction of the generated torque on the rotor 30 in a portion inside the end of the angular range is opposite to the direction of the generated torque on the rotor 30 in a portion outside the end of the angular range. Accordingly, the interval, during which a drive current remains fed to two of the stator windings "U", "V", and "W" without being changed in direction, is chosen so as to correspond to an electric angle smaller than 180 degrees. For example, this interval is chosen so as to correspond to an electric angle of 120 degrees. This design enables a smooth and reliable rotation of the rotor 30 in a desired direction.

DESCRIPTION OF THE SECOND PREFERRED EMBODIMENT

A second embodiment of this invention is similar to the first embodiment except that the preliminary operation process is modified as follows.

During the preliminary operation process, the system controller 1 controls the switch controller 4 so that test currents will be fed to the stator windings "U", "V", and "W" in the first current-feed pattern (1). While the test currents are fed to the stator windings "U", "V", and "W" in the first current-feed pattern (1), the system controller 1 activates the A/D converter 9 so that the system controller 1 will be informed by the A/D converter 9 of the present level of the common junction voltage Vcom. The system controller 1 calculates the difference between the present level of the common junction voltage Vcom and a first predetermined reference level. Then, the system controller 1 compares the calculated difference with a first predetermined difference. When the calculated difference exceeds the first predetermined difference, the system controller 1 decides the current-feed pattern (1) to be an indication of the positional relation between the stator windings "U", "V", and "W" and the magnetic poles of the rotor 30, and then finishes the preliminary operation process. The system controller 1 executes the subsequent starting operation process in response to the current-feed pattern (1). On the other hand, when the calculated difference does not exceed the first predetermined difference, the system controller 1 executes the following processes.

The system controller 1 controls the switch controller 4 so that test currents will be fed to the stator windings "U", "V", and "W" in the second current-feed pattern (2). While the test currents are fed to the stator windings "U", "V", and "W" in the second current-feed pattern (2), the system controller 1 activates the A/D converter 9 so that the system controller 1 will be informed by the A/D converter 9 of the present level of the common junction voltage Vcom. The system controller 1 calculates the difference between the present level of the common junction voltage Vcom and a second predetermined reference level. Then, the system controller 1 compares the calculated difference with a second predetermined difference. When the calculated difference exceeds the second predetermined difference, the system controller 1 decides the current-feed pattern (2) to be an indication of the positional relation between the stator windings "U", "V", and "W" and the magnetic poles of the rotor 30, and then finishes the preliminary operation process. The system controller 1 executes the subsequent starting operation process in response to the current-feed pattern (2). On the other hand, when the calculated difference does not exceed the first predetermined difference, the system controller 1 executes processes with the current-feed pattern (3) which are similar to the above-mentioned processes with the current-feed pattern (2).

In this way, the above-mentioned processes are reiterated for each of the six different current-feed patterns (1)-(6) until the system controller 1 detects that the difference between the common junction voltage Vcom and the first or second predetermined reference voltage exceeds the first or second predetermined difference. When the system controller 1 detects .that the difference between the common junction voltage Vcom and the first or second predetermined reference voltage exceeds the first or second predetermined difference, the system controller 1 decides the present current-feed pattern to be an indication of the positional relation between the rotor 30 and the stator 31, and detects the positional relation between the rotor 30 and the stator 31 in response to the present current-feed pattern. As a result, in most cases, the time spent in the detection of the positional relation between the rotor 30 and the stator 31 can be shortened relative to that in the first embodiment. In other words, the preliminary operation process can be completed more quickly than in the second embodiment.

The first predetermined reference level and the first predetermined difference are used in common for the members of the lower level group, that is, the detected levels of the common junction voltage Vcom which correspond to the current-feed patterns (1), (3), and (5). The second predetermined reference level and the second predetermined difference are used in common for the members of the higher level group, that is, the detected levels of the common junction voltage Vcom which correspond to the current-feed patterns (2), (4), and (6).

For example, the first predetermined reference level is equal to the common junction voltage Vcom which is obtained under conditions where the rotor 30 remains locked and the test currents are statically fed to the stator windings "U", "V", and "W" in the current-feed pattern (1). In addition, the second predetermined reference level is equal to the common junction voltage Vcom which is obtained under conditions where the rotor 30 remains locked and the test currents are statically fed to the stator windings "U", "V", and "W" in the current-feed pattern (2). It should be noted that the first and second predetermined reference levels may be equal to Vcc/3 and 2Vcc/3 respectively where Vcc denotes the dc power supply line voltage.

DESCRIPTION OF THE OTHER PREFERRED EMBODIMENTS

The previously-mentioned first and second embodiments may be modified as follows. While the three-phase brushless dc motor is of the 4-pole 3-segment type in the first and second embodiments, the three-phase brushless dc motor may be of other types such as an 8-pole 6-segment type, a 12-pole 9-segment type, a 16-pole 12-segment type, a 20-pole 15-segment type, a 24-pole 18-segment type, or a 4$n$-pole 3$n$-segment type where "n" denotes a natural number. The 4-pole 3-segment motor corresponds to a detection resolution of 12 (12 different angular positional regions can be discriminated), and the 4$n$-pole 3$n$-segment motor corresponds to a detection resolution of 12$n$ (12$n$ different angular positional regions can be discriminated). In addition, the three-phase brushless dc motor may be of other types such as a 2-pole 3-segment type, a 4-pole 6-segment type, a 6-pole 9-segment type, an 8-pole 12-segment type, a 10-pole 15-segment type, a 12-pole 18-segment type, or a 2$n$-pole 3$n$-segment type where "n" denotes a natural number. The 2-pole 3-segment motor corresponds to a detection resolution of 6 (6 different angular positional regions can be discriminated), and the 2$n$-pole 3$n$-segment motor corresponds to a detection resolution of 6$n$ (6$n$ different angular positional regions can be discriminated).

Figure 12A:
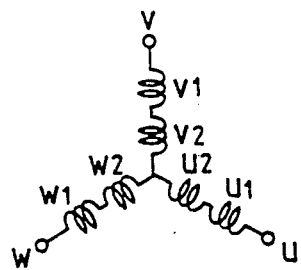
FIGS. 12, 13, 14, and 15 are diagrams of stator windings and magnetic poles of rotors in this invention.
Figure 12B:
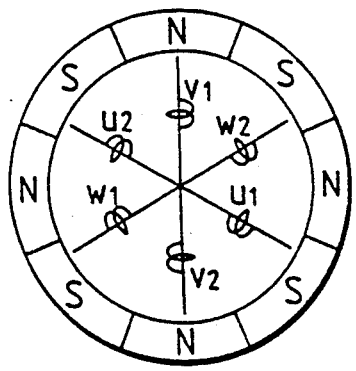

As shown in FIG. 12, the three-phase brushless dc motor of the 8-pole 6-segment type has six magnetic core segments on which sub windings U1, U2, V1, V2, W1, and W2 are provided respectively. The sub windings U1 and U2 compose a first one "U" of the three-phase windings. The sub windings V1 and V2 compose a second one "V" of the three-phase windings. The sub windings W1 and W2 compose a third one "W" of the three-phase windings. As shown in the part (b) of FIG. 12, the rotor has eight magnetic poles "N" and "S" which are alternately arranged around the stator core and which occupy equal angular ranges. The magnetic core segments provided with the sub windings of one phase face poles of the same type, and have equal positional relations with those poles respectively. For example, under conditions shown in the part (b) of FIG. 12, the axes of the magnetic core segments provided with the sub windings V1 and V2 of one phase "V" face the centers of the poles "N" in diametrically-opposed regions while the axes of the magnetic segments provided with the other sub windings do not face the centers of the poles. One phase is subjected to a maximal magnetic flux when the axes of the magnetic core segments provided with the sub windings of that phase face the centers of the poles of the same type. Currents driven through the three phases are set in a ratio of 1:1:2 so that sub windings of the phase subjected to the current "2" generate maximal magnetic fluxes. By mutual induction of the maximal magnetic fluxes, the magnetic core segments of one phase are magnetized. When a resultant magnetic flux reaches a magnitude corresponding to a saturation magnetic flux density, the magnetic core segments of one phase undergo magnetic saturation. The inductances of the sub windings of one phase vary greatly at a rotor position where a magnetic saturation occurs.

Figure 13A:
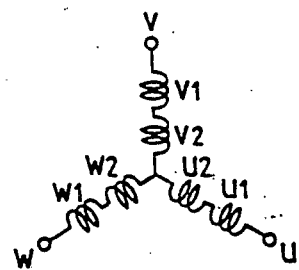
Figure 13B:
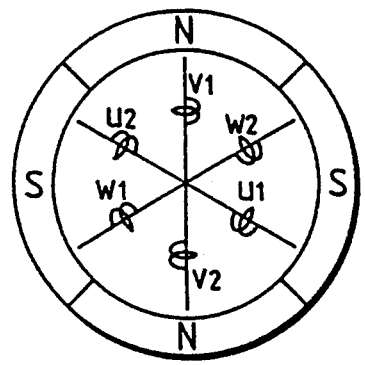

As shown in FIG. 13, the three-phase brushless dc motor of the 4-pole 6-segment type has six magnetic core segments on which sub windings U1, U2, V1, V2, W1, and W2 are provided respectively. The sub windings U1 and U2 compose a first one "U" of the three-phase windings. The sub windings V1 and V2 compose a second one "V" of the three-phase windings. The sub windings W1 and W2 compose a third one "W" of the three-phase windings. As shown in the part (b) of FIG. 13, the rotor has four magnetic poles "N" and "S" which are alternately arranged around the stator core and which occupy equal angular ranges. The magnetic core segments provided with the sub windings of one phase face poles of the same type, and have equal positional relations with those poles respectively. For example, under conditions shown in the part (b) of FIG. 13, the axes of the magnetic core segments provided with the sub windings V1 and V2 of one phase "V" face the centers of the poles "N" in diametrically-opposed regions while the axes of the magnetic segments provided with the other sub windings do not face the centers of the poles. One phase is subjected to a maximal magnetic flux when the axes of the magnetic core segments provided with the sub windings of that phase face the centers of the poles of the same type. Currents driven through the three phases are set in a ratio of 1:1:2 so that sub windings of the phase subjected to the current "2" generate maximal magnetic fluxes. By mutual induction of the maximal magnetic fluxes, the magnetic core segments of one phase are magnetized. When a resultant magnetic flux reaches a magnitude corresponding to a saturation magnetic flux density, the magnetic core segments of one phase undergo magnetic saturation. The inductances of the sub windings of one phase vary greatly at a rotor position where a magnetic saturation occurs.

Figure 14A:
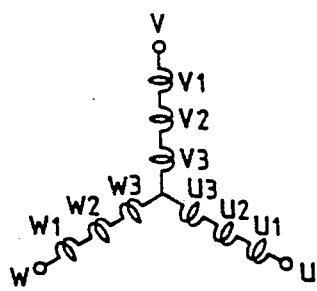
Figure 14B:
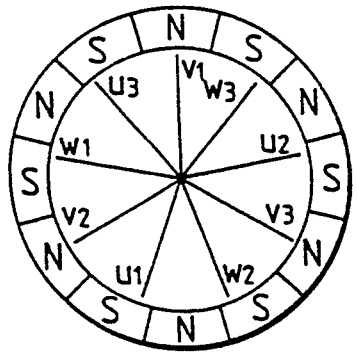

As shown in FIG. 14, the three-phase brushless dc motor of the 12-pole 9-segment type has nine magnetic core segments on which sub windings U1, U2, U3, V1, V2, V3, W1, W2, and W3 are provided respectively. The sub windings U1, U2, and U3 compose a first one "U" of the three-phase windings. The sub windings V1, V2, and V3 compose a second one "V" of the three-phase windings. The sub windings W1, W2, and W3 compose a third one "W" of the three-phase windings.

As shown in the part (b) of FIG. 14, the rotor has twelve magnetic poles "N" and "S" which are alternately arranged around the stator core and which occupy equal angular ranges. The magnetic core segments provided with the sub windings of one phase face poles of the same type, and have equal positional relations with those poles respectively. For example, under conditions shown in the part (b) of FIG. 14, the axes of the magnetic core segments provided with the sub windings V1, V2, and V3 of one phase "V" face the centers of the poles "N" angularly spaced by equal intervals of 120 degrees while the axes of the magnetic segments provided with the other sub windings do not face the centers of the poles. One phase is subjected to a maximal magnetic flux when the axes of the magnetic core segments provided with the sub windings of that phase face the centers of the poles of the same type. Currents driven through the three phases are set in a ratio of 1:1:2 so that sub windings of the phase subjected to the current "2" generate maximal magnetic fluxes. By mutual induction of the maximal magnetic fluxes, the magnetic core segments of one phase are magnetized. When a resultant magnetic flux reaches a magnitude corresponding to a saturation magnetic flux density, the magnetic core segments of one phase undergo magnetic saturation. The inductances of the sub windings of one phase vary greatly at a rotor position where a magnetic saturation occurs.

Figure 15A:
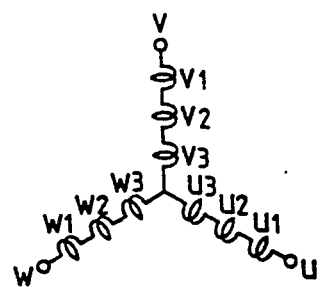
Figure 15B:
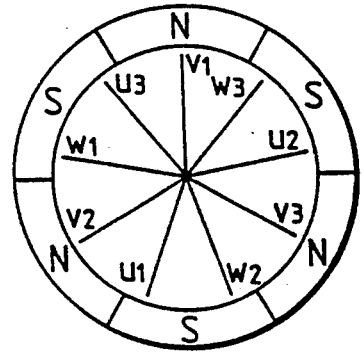

As shown in FIG. 15, the three-phase brushless dc motor of the 6-pole 9-segment type has nine magnetic core segments on which sub windings U1, U2, U3, V1, V2, V3, W1, W2, and W3 are provided respectively. The sub windings U1, U2, and U3 compose a first one "U" of the three-phase windings. The sub windings V1, V2, and V3 compose a second one "V" of the three-phase windings. The sub windings W1, W2, and W3 compose a third one "W" of the three-phase windings. As shown in the part (b) of FIG. 15, the rotor has six magnetic poles "N" and "S" which are alternately arranged around the stator core and which occupy equal angular ranges. The magnetic core segments provided with the sub windings of one phase face poles of the same type, and have equal positional relations with those poles respectively. For example, under conditions shown in the part (b) of FIG. 15, the axes of the magnetic core segments provided with the sub windings V1, V2, and V3 of one phase "V" face the centers of the poles "N" angularly spaced by equal intervals of 120 degrees while the axes of the magnetic segments provided with the other sub windings do not face the centers of the poles. One phase is subjected to a maximal magnetic flux when the axes of the magnetic core segments provided with the sub windings of that phase face the centers of the poles of the same type. Currents driven through the three phases are set in a ratio of 1:1:2 so that sub windings of the phase subjected to the current "2" generate maximal magnetic fluxes. By mutual induction of the maximal magnetic fluxes, the magnetic core segments of one phase are magnetized. When a resultant magnetic flux reaches a magnitude corresponding to a saturation magnetic flux density, the magnetic core segments of one phase undergo magnetic saturation. The inductances of the sub windings of one phase vary greatly at a rotor position where a magnetic saturation occurs.

What is claimed is:

1. A method of detecting a position of a rotor in a brushless dc motor when the rotor is stationary, the motor comprising a rotor magnet provided with a plurality of magnetic poles spaced by equal angular intervals, and a stator having a core divided into a plurality of segments spaced by equal angular intervals, the stator having polyphase stator windings provided on the core segments respectively, the stator windings having first ends and second ends, the first ends being connected to each other at a common junction, the second ends being separate from each other, wherein a total number of the core segments differs from a total number of the magnetic poles, and wherein the core segments corresponding to one phase substantially face centers of the magnetic poles of a same type while the core segments corresponding to other phases face positions offset from centers of the magnetic poles, the method comprising the steps of:

feeding test currents to the stator windings via the second ends sequentially in different current-feed patterns;

detecting voltages at a given measurement point which occur in correspondence with the different current-feed patterns respectively;

detecting differences between a predetermined reference voltage and the detected voltages at the given measurement point which correspond to the different current-feed patterns respectively;

detecting a maximal difference from among the detected differences;

determining a current-feed pattern from among the different current-feed patterns which corresponds to the detected maximal difference; and detecting a position of the rotor relative to the stator in response to the feed current corresponding to the determined current-feed pattern.

2. The method of claim 1, wherein the different current-feed patterns are separated into a first group and a second group, and a detection is given of a maximal difference from among first voltage differences corresponding to the current-feed patterns in the first group and second voltage differences corresponding to the current-feed patterns in the second group, and wherein the position of the rotor relative to the stator is detected in response to the detected maximal difference.

3. The method of claim 2, wherein the current-feed patterns in the first group are that currents flow through all the stator windings and the stator winding of one phase is subjected to an addition of currents flowing through the stator windings of other phases, and wherein the current-feed patterns in the second group are that currents flow through all the stator windings and a current flowing through the stator winding of one phase is separated into two flowing through the stator windings of other phases.

4. The method of claim 1, wherein the detected voltages at the measurement point vary in accordance with a variation in a sum of a magnetic flux generated by the magnetic poles of the rotor magnet and a magnetic flux generated by the stator windings, and are singularly maximized due to a fact that some of core segments undergo magnetic saturation by a sum of a magnetic flux generated from around centers of the rotor magnet magnetic poles of one type and a magnetic flux generated from the stator winding subjected to an addition of currents flowing through the stator windings of said other phases or the stator winding subjected to a current flowing to the stator windings of other phases in a divided manner.

5. The method of claim 1, wherein said position detecting comprises determining that core segments provided with the stator windings of one phase which are subjected to an addition of the test currents in the determined current-feed pattern or core segments provided with the stator windings of one phase from which the test currents flow in divided streams are core segments substantially facing centers of the rotor magnet magnetic poles of one type.

6. The method of claim 1, wherein the motor is a three-phase motor having three-phase stator windings, wherein the differences of the detected voltages at the given measurement point assume a singular value once per 360 degrees in electrical angle in cases where the test currents in one current-feed pattern are fed to the stator windings, and wherein a rotor position detection resolution corresponds to division by six.

7. The method of claim 1, wherein material of the stator core undergoes magnetic saturation when the core segment provided with the stator winding of one phase into which an addition of the test currents flow or from which a test current flows in a divided manner is subjected to a magnetic flux corresponding to a saturation magnetic flux density in cases where maximal mutual induction from the rotor magnet occurs.

8. The method of claim 1, wherein the given measurement point coincides with the common junction between the stator windings.

9. A method of detecting a position of a rotor in a brushless dc motor when the rotor is stationary, the motor comprising a rotor magnet provided with a plurality of magnetic poles spaced by equal angular intervals, and a stator having a core divided into a plurality of segments spaced by equal angular intervals, the stator having three-phase stator windings provided on the core segments respectively, the stator windings having first ends and second ends, the first ends being connected to each other at a common junction, the second ends being separate from each other, wherein a total number of the core segments differs from a total number of the magnetic poles, and wherein the core segments corresponding to one phase among three phases substantially face centers of the magnetic poles of a same type while the core segments corresponding to two other phases face positions offset from centers of the magnetic poles, the method comprising the steps of:

feeding test currents to the three-phase stator windings via the second ends sequentially in different current-feed patterns;

detecting voltages at a given measurement point which occur in correspondence with the different current-feed patterns respectively;

detecting differences between a predetermined reference voltage and the detected voltages at the given measurement point which correspond to the different current-feed patterns respectively;

detecting a maximal difference from among the detected differences;

determining a current-feed pattern from among the different current-feed patterns which corresponds to the detected maximal difference; and detecting a position of the rotor relative to the stator in response to the feed current corresponding to the determined current-feed pattern.

10. The method of claim 9, wherein the different current-feed patterns are separated into a first group and a second group, and a detection is given of a maximal difference from among first voltage differences corresponding to the current-feed patterns in the first group and second voltage differences corresponding to the current-feed patterns in the second group, and wherein the position of the rotor relative to the stator is detected in response to the detected maximal difference.

11. The method of claim 10, wherein the current-feed patterns in the first group are that currents flow through all the stator windings and the stator winding of one phase among the three phases is subjected to an addition of currents flowing through the stator windings of two other phases at a current ratio of 1:1:2, and wherein the current-feed patterns in the second group are that currents flow through all the stator windings and a current flowing through the stator winding of one phase among the three phases is separated into two flowing through the stator windings of two other phases at a current ratio of 2:1:1.

12. The method of claim 9, wherein the detected voltages at the measurement point vary in accordance with a variation in inductance of the stator winding by reception of a sum of a magnetic flux generated by the magnetic poles of the rotor magnet and a magnetic flux generated by the stator windings, and are singularly maximized due to a fact that some of core segments undergo magnetic saturation by a sum of a magnetic flux generated from around centers of the rotor magnet magnetic poles of one type and a magnetic flux generated from the stator winding of one phase among the three phases subjected to an addition of currents flowing through the stator windings of said two other phases at a current ratio of 1:1:2 or the stator winding of one phase among the three phases subjected to a current flowing to the stator windings of the two other phases in a divided manner.

13. The method of claim 9, wherein said position detecting comprises determining that core segments provided with the stator windings of one phase among the three phases which are subjected to an addition of the test currents in the determined current-feed pattern or core segments provided with the stator windings of one phase among the three phases from which the test currents flow in divided streams are core segments substantially facing centers of the rotor magnet magnetic poles of one type.

14. The method of claim 9, wherein the motor is a three-phase motor having three-phase stator windings, wherein the differences of the detected voltages at the given measurement point assume a singular value once per 360 degrees in electrical angle in cases where the test currents in one current-feed pattern are fed to the stator windings, and wherein a rotor position detection resolution corresponds to division by six.

15. The method of claim 9, wherein material of the stator core undergoes magnetic saturation when the core segment provided with the stator winding of one phase among the three phases into which an addition of the test currents flow or from which a test current flows in a divided manner is subjected to a magnetic flux corresponding to a saturation magnetic flux density in cases where maximal mutual induction from the rotor magnet occurs.

16. The method of claim 9, wherein the given measurement point coincides with the common junction between the stator windings.

17. An apparatus for detecting a position of a rotor in a brushless dc motor when the rotor is stationary, the motor comprising a rotor magnet provided with a plurality of magnetic poles spaced by equal angular intervals, and a stator having a core divided into a plurality of segments spaced by equal angular intervals, the stator having polyphase stator windings provided on the core segments respectively, the stator windings having first ends and second ends, the first ends being connected to each other at a common junction, the second ends being separate from each other, wherein a total number of the core segments differs from a total number of the magnetic poles, and wherein the core segments corresponding to one phase substantially face centers of the magnetic poles of a same type while the core segments corresponding to other phases face positions offset from centers of the magnetic poles, the apparatus comprising:

- means for feeding test currents to the stator windings via the second ends sequentially in different current-feed patterns;
- means for detecting voltages at a given measurement point which occur in correspondence with the different current-feed patterns respectively;
- means for detecting differences between a predetermined reference voltage and the detected voltages at the given measurement point which correspond to the different current-feed patterns respectively;
- means for detecting a maximal difference from among the detected differences;
- means for determining a current-feed pattern from among the different current-feed patterns which corresponds to the detected maximal difference; and
- means for detecting a position of the rotor relative to the stator in response to the feed current corresponding to the determined current-feed pattern.

18. An apparatus for detecting a position of a rotor in a brushless dc motor when the rotor is stationary, the motor comprising a rotor magnet provided with a plurality of magnetic poles spaced by equal angular intervals, and a stator having a core divided into a plurality of segments spaced by equal angular intervals, the stator having three-phase stator windings provided on the core segments respectively, the stator windings having first ends and second ends, the first ends being connected to each other at a common junction, the second ends being separate from each other, wherein a total number of the core segments differs from a total number of the magnetic poles, and wherein the core segments corresponding to one phase among three phases substantially face centers of the magnetic poles of a same type while the core segments corresponding to two other phases face positions offset from centers of the magnetic poles, the apparatus comprising:

- means for feeding test currents to the three-phase stator windings via the second ends sequentially in different current-feed patterns;
- means for detecting voltages at a given measurement point which occur in correspondence with the different current-feed patterns respectively;
- means for detecting differences between a predetermined reference voltage and the detected voltages at the given measurement point which correspond to the different current-feed patterns respectively;
- means for detecting a maximal difference from among the detected differences;
- means for determining a current-feed pattern from among the different current-feed patterns which corresponds to the detected maximal difference; and
- means for detecting a position of the rotor relative to the stator in response to the feed current corresponding to the determined current-feed pattern.

* * * * *

UNITED STATES PATENT AND TRADEMARK OFFICE
CERTIFICATE OF CORRECTION

PATENT NO. : 5,350,987
DATED : September 27, 1994
INVENTOR(S) : Yasuhiro UEKI

It is certified that error appears in the above-indentified patent and that said Letters Patent is hereby corrected as shown below:

On the title page, please delete item [63] and insert the following therefor:

--[63]  Continuation-in-part of Ser. No. 965,035, Oct. 22, 1992, Pat. No. 5,254,918, which is a continuation of Ser. No. 709,601, Jun. 5, 1991, abandoned.--

Signed and Sealed this

Twenty-eight Day of March, 1995

Attest:

BRUCE LEHMAN

Attesting Officer     Commissioner of Patents and Trademarks